Nov. 13, 1934.　　　C. C. KINKER　　　1,980,344
GLASS FURNACE
Filed Jan. 26, 1931　　　2 Sheets-Sheet 1
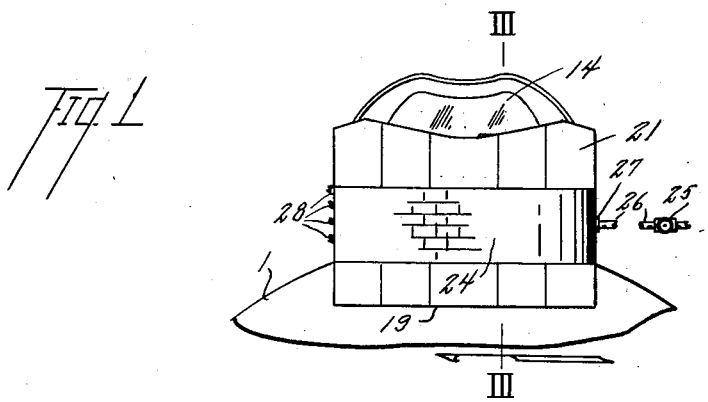
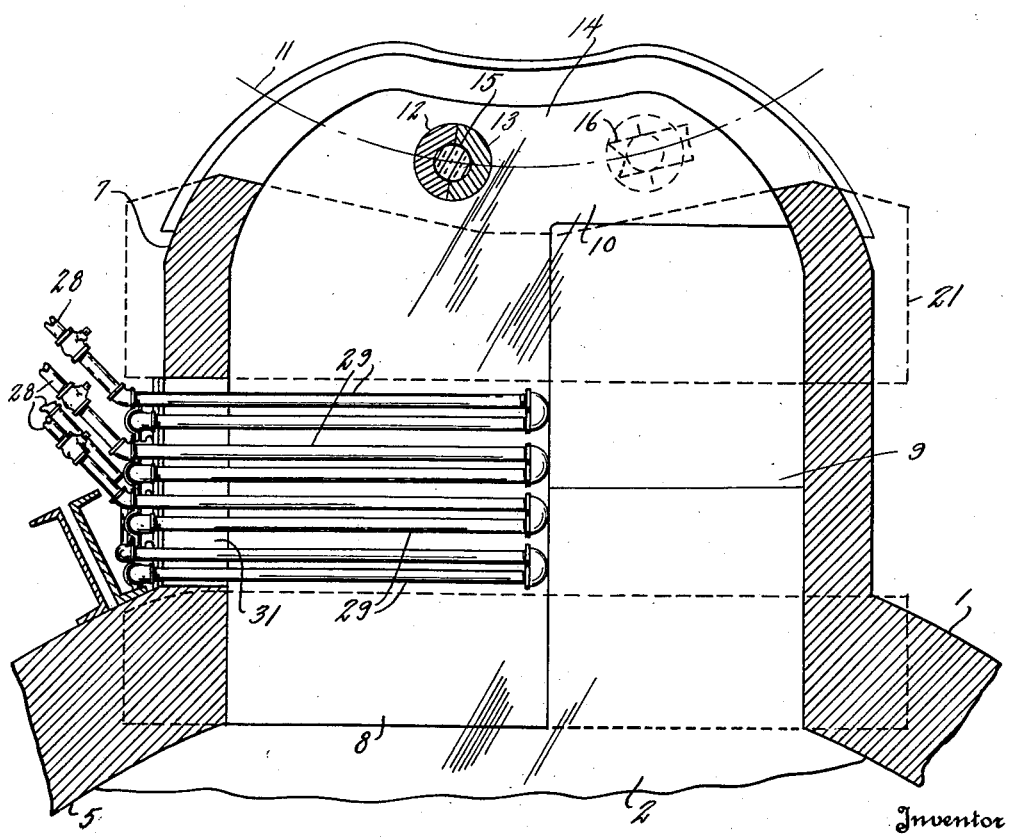
Inventor
Clarence C. Kinker

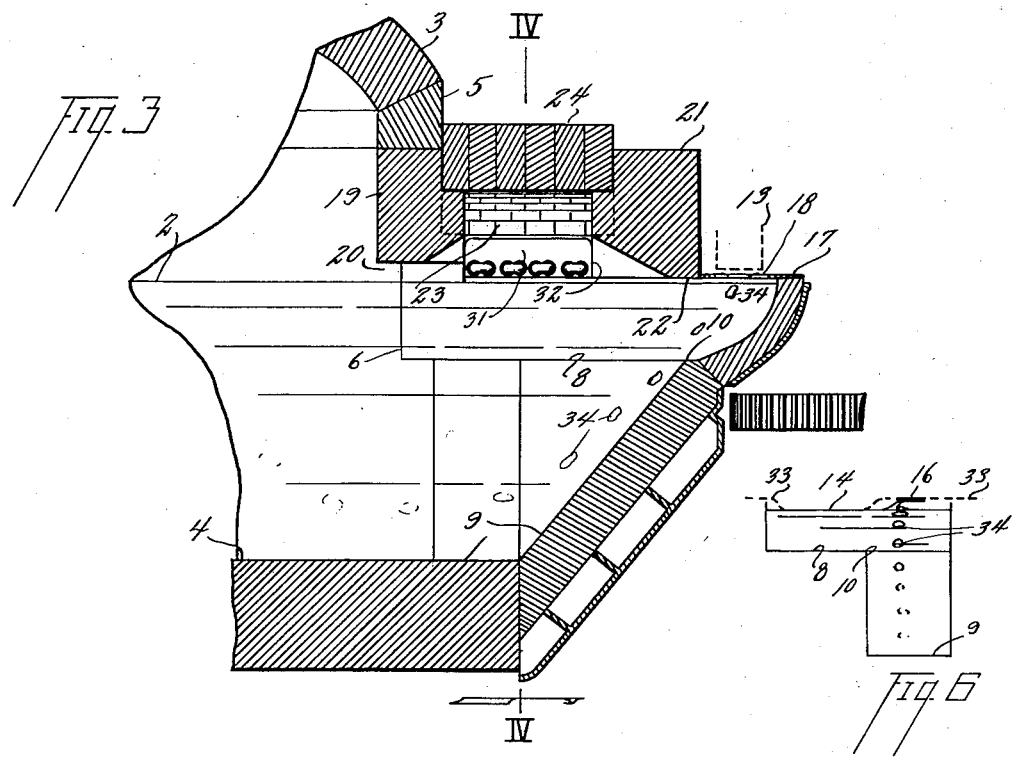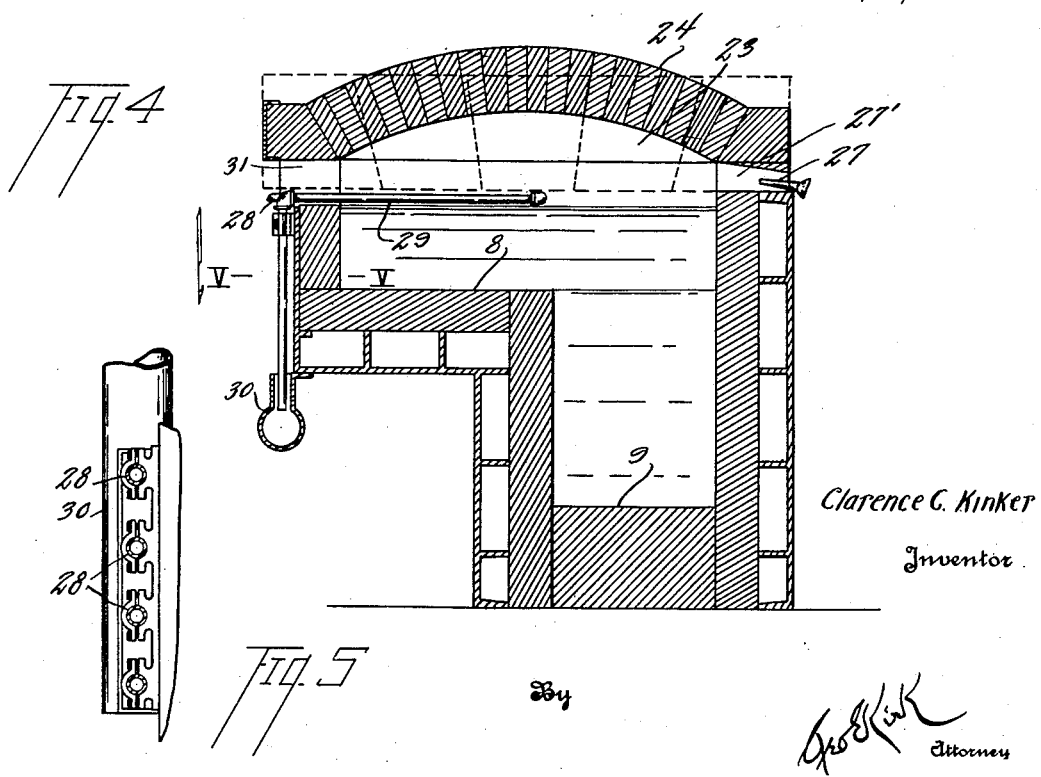

Patented Nov. 13, 1934

1,980,344

UNITED STATES PATENT OFFICE 1,980,344

GLASS FURNACE

Clarence C. Kinker, Toledo, Ohio, assignor, by mesne assignments, to Owens-Illinois Glass Company, Toledo, Ohio, a corporation of Ohio Application January 26, 1931, Serial No. 511,224

9 Claims. (Cl. 49—56)

This invention relates to molten glass handling at a tank or furnace in proximity to gathering therefrom.

This invention has utility when incorporated in features of a molten glass tank for forebay construction and operation.

Referring to the drawings:

Fig. 1 is a fragmentary plan view of a glass tank with a forebay or extension embodying the invention herein;

Fig. 2 is a view similar to Fig. 1, on an enlarged scale, with the extension roof removed;

Fig. 3 is a section on the line III—III, Fig. 1;

Fig. 4 is a section on the line IV—IV, Fig. 3;

Fig. 5 is a section on the line V—V, Fig. 4; and

Fig. 6 is a diagrammatic view showing the glass flow away from the place of shearing.

Glass tank 1 is shown as having pool of molten glass 2 therein, and provided with roof 3, bottom 4 and side wall 5. Through this side wall 5 is opening 6 into forebay or extension 7 which has shallow floor portion 8 and deeper floor portion 9 tapering from forward floor portion 10 back and downward toward the floor 4 of the main tank or furnace 1.

The portion 10 is in the region exposed for gather removal, having gather travel line 11 for blank mold sections 12, 13, which may be brought in proximity to the upper exposed surface 14 of the molten glass. A gather 15 is lifted by suction into this gather mold 12, 13, during its travel along the line 11 and then as the molds are lifted upward it is acted upon by shear 16. In this removal of a molten glass gather from the pool, the tail portion as depending from the gather is severed by the shear 16 and drops back upon or into the surface 14 above the shallow floor portion 10. In this gathering operation at the exposed region, even when such portion be protected by shield 17 to leave minor exposed portion 18, there is a tendency to chill and the cooler portions have a greater specific gravity and a normal tendency to sink.

This tendency is promoted by the inclined floor 9 allowing such residue to normally automatically leave the gather region, work back into the tank for re-melting to have its temperature raised and be thinned to the desired consistency for a complete merging into the pool 2.

The extension is herein shown as provided with arch 19 in proximity to the main tank or furnace with clearance 20 over the pool of molten glass. Spaced from this arch 19 is additional arch 21 having its lower edge 22 of less clearance from the molten glass surface than the arch 19. There is thus provided between these arches 19, 21, chamber 23 with roof 24. These arches have chamber capacity upward from the arch lower sides greater than the chamber capacity therebelow.

In this chamber 23 above the surface of the molten glass may be placed temperature control means. To this end valve 25 in fuel supply line 26 may control burner 27 at port 27' for raising the temperature in the chamber 23. In the event a reduction in the temperature in the chamber 23 is desired, water or steam supply lines 28 may extend to coils 29 having spill into take-off line 30. These coils 29 are independently controllable and may be adjusted in opening 31 as to clearance from the surface of the pool and have removable block 32 placed for closing the opening about these pipes when in their adjusted position. There is thus minimized heat radiation from the chamber 23.

The mold bottom travels along line 33 (Fig. 6) until just over the shallow portion of the pool at which point it dips to have the mold bottom adjacent the pool surface 14 to allow suction of glass therefrom into the molds. The molds then travel across the pool and lift just before getting over the deeper region. As the mold lifts there is attenuation or tail 34 extending from the charge to the pool surface. At a point over the deeper pool region, shear 16 severs the charge from the pool and these attenuations, having been chilled drop into the pool and sink downwardly thereinto. They are gradually re-heated to the pool temperature until they merge into the body of glass 2.

What is claimed and it is desired to secure by United States Letters Patents is:

1. A glass tank for a pool of molten glass, an extension therefrom having a pool upper surface exposing portion, an arch at the furnace depending into proximity with the pool, an additional arch at the surface exposing portion spaced from the arch at the furnace, there being a chamber in said extension between the arches, said chamber having an arched roof wall, a burner, and cooling coil means beneath the arched roof wall and above the pool.

2. A glass tank for a pool of molten glass, an extension therefrom having a pool upper surface exposing portion for a line of gather-effecting travel, and different level floors in the extension, one level of floor being toward one end and a different level of floor being toward the other end of the exposed surface portion.

3. A glass tank for a pool of molten glass, an extension therefrom having a pool upper surface exposing portion for a line of gather-effecting travel, and different level floors in the extension, one level floor from one end being abruptly more shallow than toward the other end of said upper surface exposing portion.

4. A glass tank for a pool of molten glass, an extension therefrom having a pool upper surface exposing portion for a line of gather-effecting travel, and a floor level shallow from the tank into one end of the upper surface exposed portion, said floor level being deeper back and downward to the tank for the other end portion from said upper exposed surface portion.

5. The method of handling molten glass comprising charging a mold therewith by suction from a pool having different level floors, moving said mold over the pool to a position above a lower level floor, and shearing said charge from the pool.

6. A tank forebay having an exposed upper surface gather region for removing charges of glass therefrom, said forebay having a shallow inflow portion extending to a charge removing greater depth portion.

7. A tank forebay having an exposed upper surface gather region for removing charges of glass therefrom, said forebay having a shallow inflow portion at which gather removal is initiated, and an adjacent deeper portion at which charge removal is completed.

8. A tank forebay having an exposed upper surface gather region for removing charges of glass therefrom, said forebay having a shallow inflow portion for the molten glass from the upper surface of which gather removal is initiated, and an adjacent portion with its bottom tapering downward toward the tank, at which portion charge removal is completed and wherein settling disappearance of chilled residue from said removal may occur.

9. From a glass tank for a pool of molten glass having different floor levels, the method of charging a mold comprising the act of locating the mold in position over one floor level, the act of charging the mold with glass from the pool with the mold in such position thereover, the act of shifting the mold relatively to the pool to a position over a lower floor level, and while the mold is still above the pool then severing the charge of glass as extending from the mold for said severed portion to fall into the pool.

CLARENCE C. KINKER.